United States Patent
Renaudier et al.

(10) Patent No.: US 9,621,276 B2
(45) Date of Patent: Apr. 11, 2017

(54) OPTICAL TRANSMITTER FOR TRANSMITTING A MULTILEVEL AMPLITUDE-SHIFT-KEYING MODULATED SIGNAL

(71) Applicant: Alcatel Lucent, Boulogne Billancourt (FR)

(72) Inventors: Jeremie Renaudier, Nozay (FR); Gabriel Charlet, Nozay (FR); Haik Mardoyan, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 34 days.

(21) Appl. No.: 14/413,071

(22) PCT Filed: Jun. 21, 2013

(86) PCT No.: PCT/EP2013/063015
§ 371 (c)(1),
(2) Date: Jan. 6, 2015

(87) PCT Pub. No.: WO2014/012745
PCT Pub. Date: Jan. 23, 2014

(65) Prior Publication Data
US 2015/0207570 A1    Jul. 23, 2015

(30) Foreign Application Priority Data
Jul. 19, 2012 (EP) .................... 12177022

(51) Int. Cl.
*H04B 10/00*    (2013.01)
*H04B 10/12*    (2006.01)
(Continued)

(52) U.S. Cl.
CPC .......... *H04B 10/54* (2013.01); *H04B 10/504* (2013.01); *H04B 10/564* (2013.01)

(58) Field of Classification Search
CPC H04B 10/5165; H04B 10/505; H04B 10/504; H04B 10/54
(Continued)

(56) References Cited

U.S. PATENT DOCUMENTS 6,452,706 B1 *   9/2002   Iida .................... H04B 10/2519
                                              398/158
8,451,528 B1 *   5/2013   Kuo .......................... G02F 1/07
                                              359/264

(Continued)

FOREIGN PATENT DOCUMENTS

CN          1604514       4/2005
CN        101394232       3/2009
(Continued)

OTHER PUBLICATIONS

Xiang-Jun, X. et al; Improvement of Amplitude-Shift-Keying Signal Quality by Employing an Effective Spectrum Equalization Method in a Combined FSK/ASK Modulation Scheme; China Physical Society; vol. 22, No. 8 (2005); pp. 1948-1590; China Physical Society and IOP Publishing Ltd.

*Primary Examiner* — Oommen Jacob
(74) *Attorney, Agent, or Firm* — Patti & Malvone Law Group, LLC

(57) ABSTRACT

An optical transmitter for transmitting a multilevel amplitude-shift-keying modulated signal includes an optical modulator for modulating an optical signal with a multilevel amplitude-shift-keying modulation, and a spectral filter adapted to increase a high-frequency component of the modulated optical signal relatively to a central frequency component. The multilevel ASK modulation is quaternary ASK and the symbol rate of the optical modulator is above 40 Gbaud. An optical link connects the optical transmitter to a quadratic direct detection optical receiver.

14 Claims, 4 Drawing Sheets

(51) Int. Cl.
*H04B 10/54* (2013.01)
*H04B 10/50* (2013.01)
*H04B 10/564* (2013.01)

(58) Field of Classification Search
USPC .................................... 398/140, 115, 147
See application file for complete search history.

(56) References Cited

U.S. PATENT DOCUMENTS

| | | | | |
|---|---|---|---|---|
| 8,543,009 | B2* | 9/2013 | Bulot | H04B 10/505 398/182 |
| 2006/0078336 | A1* | 4/2006 | McNicol | H04B 10/25137 398/147 |
| 2007/0222654 | A1* | 9/2007 | Vrazel | H04B 10/516 341/144 |
| 2007/0291879 | A1 | 12/2007 | Yamazaki et al. | |
| 2009/0304395 | A1* | 12/2009 | Hong | H04B 10/5055 398/189 |
| 2010/0061737 | A1* | 3/2010 | Kato | H04B 10/6971 398/147 |
| 2010/0111545 | A1* | 5/2010 | Banwell | H04B 10/66 398/208 |
| 2010/0196013 | A1* | 8/2010 | Franklin | H04B 10/5165 398/115 |
| 2010/0260505 | A1* | 10/2010 | Dahan | H04B 10/541 398/183 |
| 2010/0278528 | A1* | 11/2010 | Isomura | H04B 10/61 398/25 |
| 2011/0013914 | A1* | 1/2011 | Lowery | H04B 10/60 398/158 |
| 2012/0057626 | A1* | 3/2012 | Zhong | H04L 7/0087 375/233 |
| 2012/0082466 | A1 | 4/2012 | Wu et al. | |
| 2012/0224849 | A1* | 9/2012 | Rylyakov | H04B 10/2507 398/27 |
| 2012/0224866 | A1* | 9/2012 | Gaete | H04L 27/2096 398/186 |
| 2012/0327977 | A1* | 12/2012 | Meyer | H04L 7/027 375/211 |
| 2013/0027763 | A1* | 1/2013 | Hauenschild | H04B 10/541 359/276 |
| 2013/0058642 | A1* | 3/2013 | Bouda | H04B 10/29 398/25 |
| 2013/0136451 | A1* | 5/2013 | Yoshida | H04B 10/532 398/65 |
| 2014/0029957 | A1* | 1/2014 | Sethumadhavan | H04B 10/588 398/192 |
| 2015/0207570 | A1* | 7/2015 | Renaudier | H04B 10/504 398/140 |

FOREIGN PATENT DOCUMENTS

| | | |
|---|---|---|
| CN | 101420636 | 4/2009 |
| EP | 0877495 | 11/1998 |
| JP | H0371118 | 3/1991 |
| JP | 2000019470 | 1/2000 |
| JP | 2003143076 | 5/2003 |
| JP | 2007067698 | 3/2007 |
| JP | 2009147862 | 7/2009 |
| JP | 2010154559 | 7/2010 |
| JP | 2011044913 | 3/2011 |
| JP | 2011160257 | 8/2011 |
| KR | 10-1998-0081362 | 11/1998 |

* cited by examiner

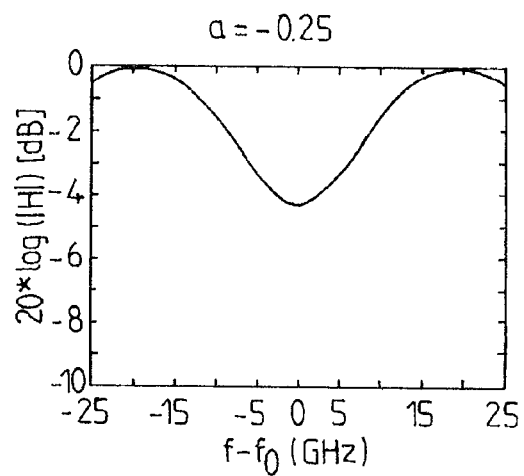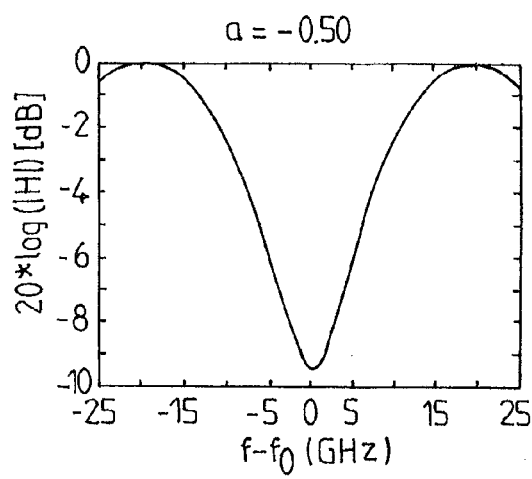
FIG.5    FIG.6
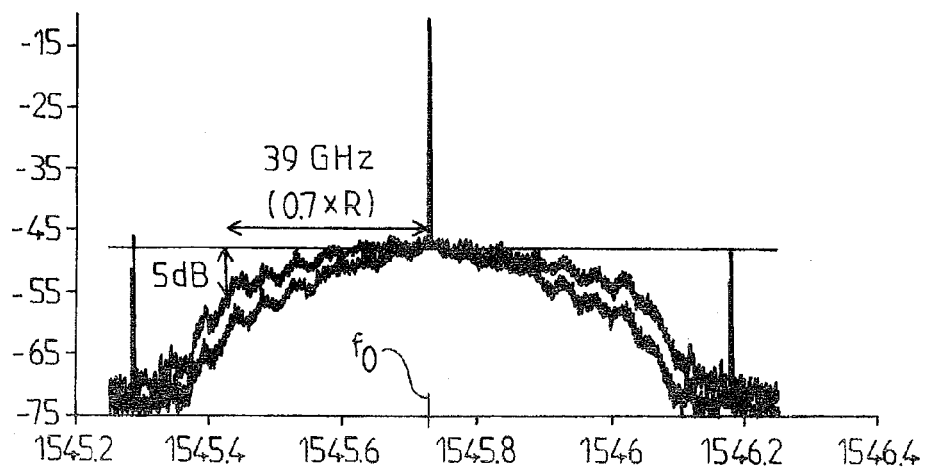
FIG.7

OPTICAL TRANSMITTER FOR TRANSMITTING A MULTILEVEL AMPLITUDE-SHIFT-KEYING MODULATED SIGNAL

FIELD OF THE INVENTION

The invention relates to the technical field of optical communication systems, in particular communications systems employing multilevel amplitude-shift-keying (ASK) modulation schemes.

BACKGROUND

Optical fiber transmissions employing coherent detection make it possible to achieve very high data rates over long distances, e.g. typically 100 Gb/s per wavelength channel. However coherent detection solutions may be too expensive for some applications, e.g. short reach transmissions. Therefore a need exists for optical transmission techniques that achieve a high data rate and remain compatible with direct detection of the signal intensity, i.e. quadratic detection, at the destination node.

SUMMARY

In an embodiment, the invention provides an optical transmitter for transmitting a multilevel amplitude-shift-keying modulated signal, comprising:
an optical modulator for modulating an optical signal with a multilevel amplitude-shift-keying modulation, and
a spectral filter adapted to increase a high-frequency component of the modulated optical signal relatively to a central frequency component.

According to embodiments, such optical transmitters can comprise one or more of the features below.

In embodiments, the multilevel ASK modulation is quaternary ASK.

In embodiments, the symbol rate of the optical modulator is above 40 Gbaud, for example about 56 Gbaud.

In embodiments, the high-frequency component of the modulated optical signal comprises a frequency higher than $f_0+0.5$ R, wherein $f_0$ is a central frequency of the optical signal and R is the symbol rate of the optical modulator.

In embodiments, the high-frequency component of the modulated optical signal comprises a frequency equal to $f_0+0.7$ R.

In embodiments, the spectral filter comprises a Feed Forward filter arranged to filter a baseband electrical signal that drives the optical modulator.

In embodiments, the Feed Forward filter comprises a single delay-tap with a negative configurable delay-tap coefficient.

In embodiments, the Feed Forward filter comprises a plurality of delay-taps with a plurality of configurable delay-tap coefficients.

In embodiments, the spectral filter comprises an optical spectral equalizer for equalizing the modulated optical signal In embodiments, the optical transmitter further comprises a feedback loop including a quality measurement module for measuring a quality of the transmitted optical signal and a feedback controller for reconfiguring the spectral filter as a function of the measured quality.

In embodiments, the quality measurement module is adapted to measure an eye-diagram opening of the transmitted optical signal.

In embodiments, the quality measurement module is adapted to measure a power ratio between the high-frequency component of the transmitted optical signal and the central frequency component of the transmitted optical signal.

In embodiments, the feedback controller is adapted to increase the absolute value of a negative delay-tap coefficient of the Feed Forward filter in response to the measured eye-diagram opening or power ratio being lower than a target value.

In embodiments, the feedback controller is adapted to increase the gain of a high-frequency channel of the optical spectral equalizer in response to the measured eye-diagram opening or power ratio being lower than a target value.

In embodiments, the optical transmitter further comprises a laser source for generating the optical signal.

In an embodiment, the invention also provides an optical communication system comprising:
the above mentioned optical transmitter,
an optical receiver, and
an optical link connecting the optical receiver to the optical transmitter in the optical domain.

According to embodiments, such optical communication systems can comprise one or more of the features below.

In embodiments, the optical receiver is a quadratic direct detection receiver.

In embodiments, a range of the optical communication system is shorter than 100 km, preferably shorter than 10 km.

Aspects of the invention are based on the idea of generating a high-rate multilevel ASK signal that can be successfully demodulated with a quadratic direct detection receiver. Aspects of the invention stem for the observation that power equalization makes it possible to reduce inter-symbol interferences in a high-rate multilevel ASK signal. Aspects of the invention are based on the idea of employing a feedback loop to update the coefficients of a spectral filter to maintain an optimal configuration of the spectral filter.

BRIEF DESCRIPTION OF THE DRAWINGS

These and other aspects of the invention will be apparent from and elucidated with reference to the embodiments described hereinafter, by way of example, with reference to the drawings.

FIGS. 5 and 6 are two graphs showing the transfer function of the filter of FIG. 4 for two different values of the single tap coefficient.

FIG. 7 is a graph showing the power spectrum of a quaternary ASK-modulated optical signal obtainable with the transmitter of FIG. 3.

DETAILED DESCRIPTION OF THE EMBODIMENTS

Figure 1:
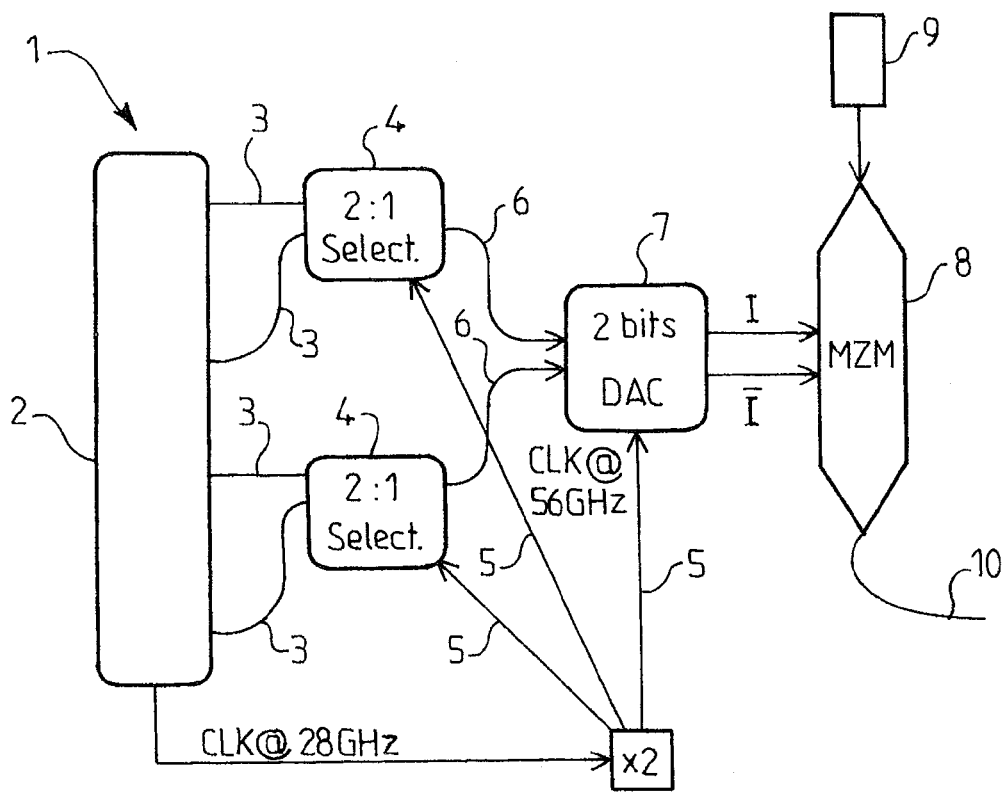
FIG. 1 is a functional representation of an optical transmitter suitable for generating a quaternary ASK-modulated optical signal.

FIG. 1 shows an optical transmitter 1 for generating a modulated optical signal at 100 Gb/s based on 4-level amplitude shift keying (4-ASK). Such a 4-ASK modulated signal can be used for short reach transmissions using direct detection.

The transmitter 1 comprises a binary signal generator 2 that generates four NRZ-coded binary streams 3 at a clock rate of 28 GHz. Two multiplexers 4 are arranged to receive two binary streams 3 each. The multiplexer 4 is driven by a clock signal 5 at 56 GHz to interleave both binary streams 3 into a 56 Gb/s NRZ-coded binary stream 6. Both of the resulting 56 Gb/s binary streams 6 are fed to a 2-bits digital-to-analog converter 7 that generates a 4-level driving signal I and the complementary 4-level signal $\bar{I}$ to drive a Mach-Zehnder modulator 8 (MZM) in a push-pull mode.

The push-pull mode means that binary driving signals having mutually reversed phases are input to a data input terminal and an inverted data input terminal of the MZM 8 and the peak voltages of those binary driving signals are set to a half wavelength voltage of the Mach-Zehnder interferometer.

The MZM 8 receive an optical carrier wave from a laser source 9 and outputs a modulated optical signal 10 carrying a 4-ASK modulation at a symbol rate R=56 Gbaud, i.e. equivalent to 112 Gb/s.

Figure 2:
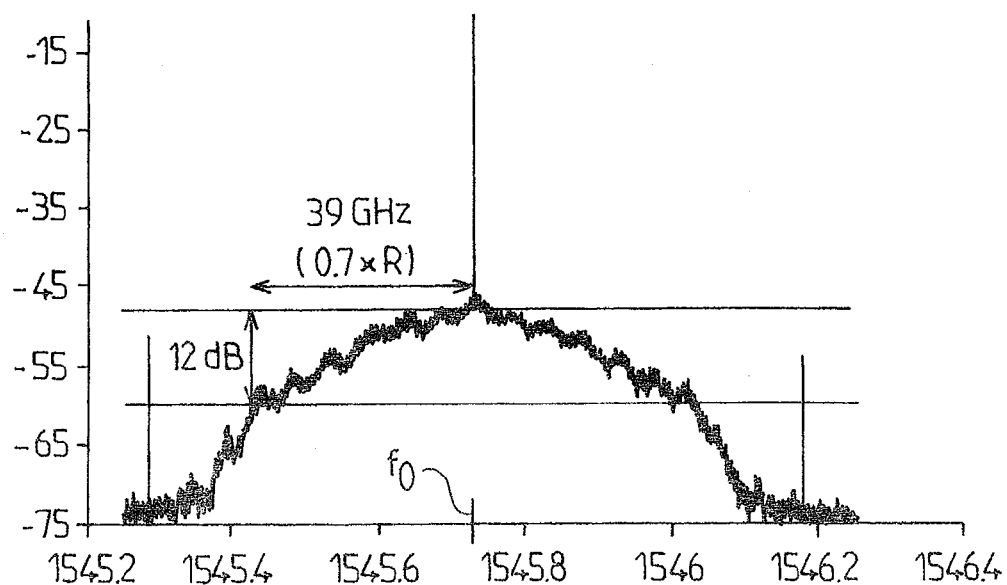
FIG. 2 is a graph showing the power spectrum of a quaternary ASK-modulated optical signal.

The power spectrum of the resulting modulated signal 10 can be seen in FIG. 2. The ability to generate the multi-level modulated signal at such a high baud rate is limited by the combined bandwidth of the electrical drivers 7 and the optical modulator 8. Commercial optical modulators with low Voltage drive usually have 3 dB-bandwidth below 35 GHz.

The bandwidth limitation of the transmitter induces large filtering of high frequency components, yielding a quite closed 4-level optical eye diagram. The bandwidth limitation for the 56 Gbaud 4-ASK signal 10 is rendered visible by the 12 dB attenuation of the spectral components located at 0.7×R from the carrier frequency $f_0$ in FIG. 2. These limitations induce inter-symbol interferences (ISI) that severely degrade the performance of the transmitter.

Equalization can be employed to mitigate such bandwidth limitations by enhancing spectral content at high frequencies. For instance, feed forward equalizers (FFE) can be used and implemented either in the electrical or the optical domain.

With reference to FIGS. 3 to 10, there will now be described embodiments of a similar optical transmitter in which optical or electrical spectral equalization is employed to mitigate the inter-symbol interferences (ISI) induced penalties. Elements identical or similar to those of FIG. 1 are designated by the same numeral as in FIG. 1.

Figure 4:
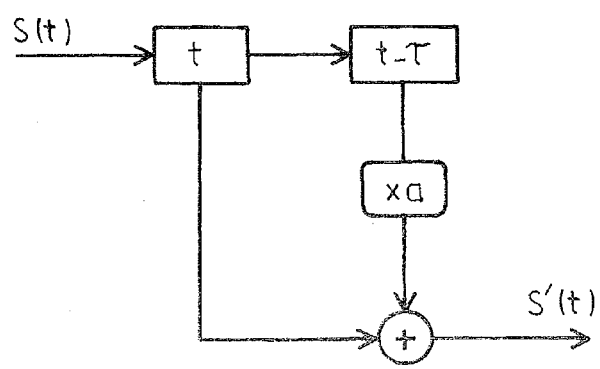
FIG. 4 is a functional representation of a Feed Forward filter employed in the optical transmitter of FIG. 3.

In the embodiment of FIG. 4, spectral equalization is achieved in the electrical domain by a Feed Forward Equalizer 11 arranged between the digital-to-analog converter 7 and the optical modulator 8. An amplifier may also be arranged between DAC 7 and Feed Forward Equalizer 11.

In an embodiment depicted in FIG. 4, the FFE 11 is a single delay-tap equalizer having a single tap coefficient a. In FIG. 4, τ designates the delay of one symbol. The transfer function H(f) of this single delay-tap equalizer is:

$$H(f)=(1+a \cdot e^{-i2\pi f\tau})/2 \qquad \text{(Eq. 1)}$$

FIGS. 5 and 6 illustrate the filter gain as a function of frequency for two different values of tap coefficient a. Particularly, negative values of the tap coefficient a result in amplification of the high frequency spectral components with respect to the central frequency component at $f_0$. By increasing the absolute value of the delay-tap coefficient a, the pre-emphasis of high frequency components is increased. Indeed the equalizer response in FIG. 6 has a more pronounced pre-emphasis of high frequency components than equalizer response in FIG. 5.

By adjusting the delay-tap coefficient a, the transfer function H(f) of the equalizer can be modified to provide an optimal amplification of the high frequency components that have been attenuated by the electrical driver, e.g. the high-frequency component at $$f-f_0=0.7R \qquad \text{(Eq. 2)}$$

FIG. 7 shows the spectrum of the same 4-ASK modulated signal 10 as discussed in FIG. 2, where the driving signals are now spectrally equalized with the transfer function shown in FIG. 6.

The filtering reduces the power discrepancy between low and high frequency components of the modulated signal. As can be seen in FIG. 7, the equalized spectrum is more flat so that the corresponding eye diagram is as more open.

In a preferred embodiment, the optimal configuration of the equalizer 11 bringing the best performance is determined automatically as a function of the characteristics of both the electrical driver and the optical modulator. This is especially useful if the optical receiver 15 that is employed at the destination relies on quadratic direct detection.

Figure 3:
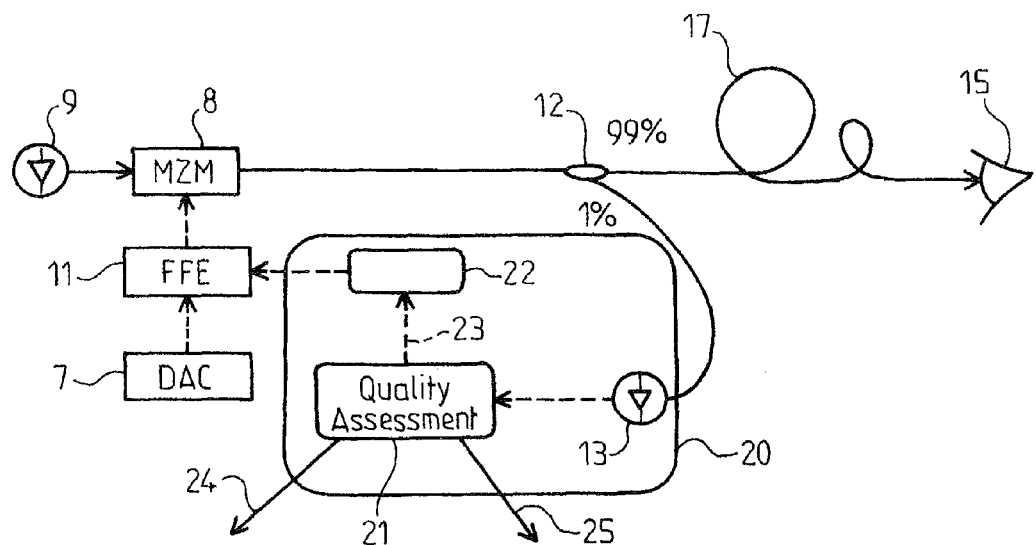
FIG. 3 is a functional representation of an optical transmitter in accordance with an embodiment.

In order to adjust the equalizer response as a function of the characteristics of the 4-ASK transmitter 1, the transmitter of FIG. 3 further comprises a feedback loop 20. Using a 1% optical splitter 12 followed by a wideband photodiode 13, a quality assessment module 21 assesses the quality of the equalized signal and provides a quality measurement signal 23 to a control module 22 that reconfigures the FFE 11 as a function of the measurement. For example, the quality assessment module 21 measures the flatness of the spectrum through spectral analysis as shown by arrow 24 or the opening of the eye diagram through time domain analysis as shown by arrow 25.

The control module 22 selects an optimal equalizer configuration that yields the best quality of the 4-ASK equalized signal either by tuning the filter coefficients or by selecting predefined filter profiles stored in a look-up table.

Figure 8:
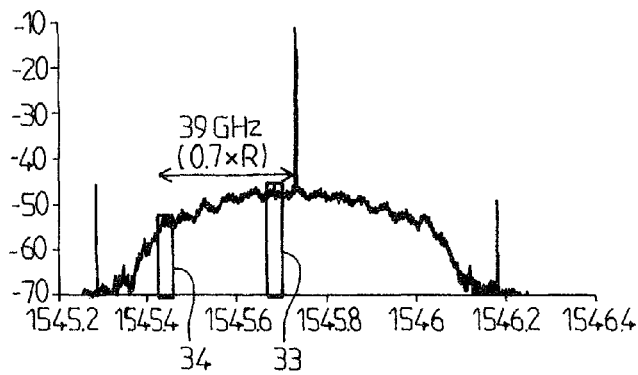
FIG. 8 is a graph showing the power spectrum of a quaternary ASK-modulated optical signal and two spectral bands monitored by a quality assessment module.
Figure 9:
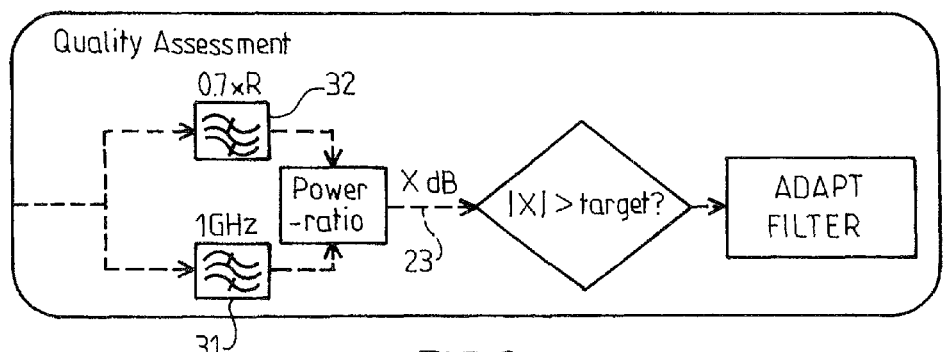
FIG. 9 is a flow chart showing the operations of a feedback loop in an embodiment.

In an embodiment depicted in FIGS. 8 and 9, the quality assessment module 21 comprises a pair of band pass filters 31 and 32 to measure the power spectral density of the signal at different frequencies, typically in first a frequency band 33 close to the carrier frequency $f_0$ and a second frequency band 34 located at 0.7×R from the carrier frequency $f_0$. To assess the balance between low and high frequency spectral components, the quality assessment module 21 computes the power ratio in dB obtained from these two measurements and provides that data as the measurement signal 23 to the control module 22. The control module 22 compares the computed ratio to a preset target value. The target value can be defined using a calibration process. In the example shown in FIG. 7, the power ratio of 5 dB between low and high frequency components is considered as a suitable target value.

If the computed ratio is above the preset target, the control module 22 adjusts the filter 11, e.g. the absolute value of the delay-tap coefficient a of the filter 11 is increased.

In an embodiment, the quality assessment module 21 measures the opening of the eye diagram by computing a Time domain quality factor defined as:

$$Q = \Sigma_1^3 (I_{k+1} - I_k)/(\sigma_{k+1} - \sigma_k).\qquad\text{(Eq. 3)}$$

Where $I_k$ stands for the mean value of the k-th level of the signal and $\sigma_k$ stands for its standard deviation.

Figure 10:
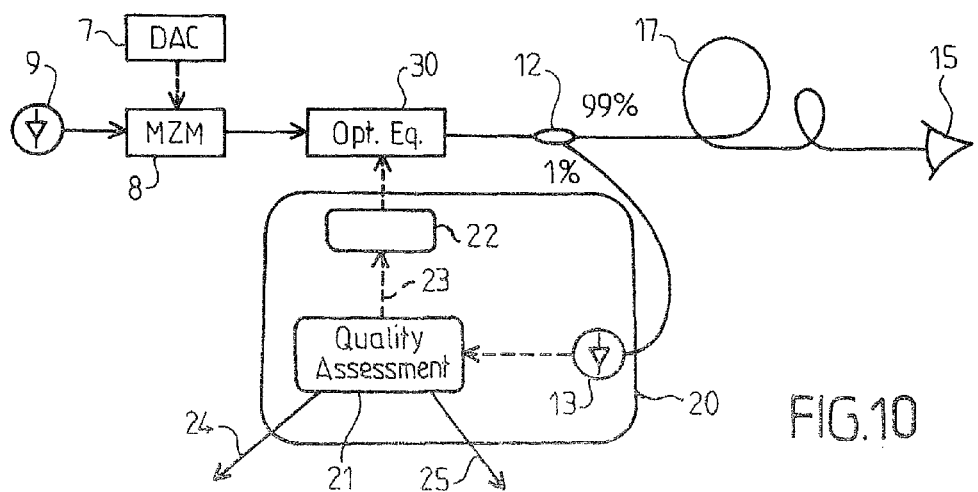
FIG. 10 is a functional representation of an optical transmitter in accordance with another embodiment.

In the above embodiment, equalization is performed in the electrical domain using the FFE 11. However, the same equalization could be performed in the optical domain using an optical spectral equalizer, e.g. a device known as Wave-Shaper® available from Finisar Corp. USA. A corresponding embodiment is illustrated in FIG. 10, where the optical spectral equalizer 30 is arranged between the MZM 8 and the optical splitter 12. A similar feedback loop 20 can be applied whatever the type of equalization chosen, either electrical as in FIG. 3 or optical as in FIG. 10. In an embodiment, an amplifier is arranged between DAC 7 and optical modulator 8.

The above transmitters have been successfully tested in a short reach optical communication system with an optical link 17 of 1 km. However, the achievable range of such systems depends on a number of parameters as will be appreciated by those skilled in the art. Optical amplifiers and electrical amplifiers can be arranged at different points in the system to adjust the range.

Elements such as the quality assessment and control modules could be e.g. hardware means like e.g. an ASIC, or a combination of hardware and software means, e.g. an ASIC and an FPGA, or at least one microprocessor and at least one memory with software modules located therein.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. An optical transmitter for transmitting a multilevel amplitude-shift-keying modulated signal, comprising:
   an optical modulator for modulating an optical signal with a multilevel amplitude-shift-keying modulation;
   a spectral filter adapted to increase a high-frequency component of the modulated optical signal relatively to a central frequency component; and
   a feedback loop further comprising a quality measurement module for measuring a quality of the transmitted optical signal and a feedback controller for reconfiguring the spectral filter as a function of the measured quality.

2. An optical transmitter in accordance with claim 1, wherein the multilevel ASK modulation is quaternary ASK.

3. An optical transmitter in accordance with claim 1, wherein the symbol rate of the optical modulator is above 40 Gbaud.

4. An optical transmitter in accordance with claim 1, wherein the high-frequency component of the modulated optical signal comprises a frequency higher than $f_0 + 0.5R$, wherein $f_0$ is a central frequency of the optical signal and R is the symbol rate of the optical modulator.

5. An optical transmitter in accordance with claim 4, wherein the high-frequency component of the modulated optical signal comprises a frequency equal to $f_0 + 0.7R$.

6. An optical transmitter in accordance with claim 1, wherein the spectral filter further comprises a Feed Forward filter arranged to filter a baseband electrical signal that drives the optical modulator.

7. An optical transmitter in accordance with claim 6, wherein the Feed Forward filter further comprises a single delay-tap with a negative configurable delay-tap coefficient.

8. An optical transmitter in accordance with claim 6, wherein the Feed Forward filter further comprises a plurality of delay-taps with a plurality of configurable delay-tap coefficients.

9. An optical transmitter in accordance with claim 1, wherein the spectral filter further comprises an optical spectral equalizer for equalizing the modulated optical signal.

10. An optical transmitter in accordance with claim 1, wherein the quality measurement module is adapted to measure an eye-diagram opening of the transmitted optical signal.

11. An optical transmitter in accordance with claim 1, wherein the quality measurement module is adapted to measure a power ratio between the high-frequency component of the transmitted optical signal and the central frequency component of the transmitted optical signal.

12. An optical transmitter in accordance with claim 10, wherein the spectral filter further comprises a Feed Forward filter arranged to filter a baseband electrical signal that drives the optical modulator and the feedback controller is adapted to increase the absolute value of a negative delay-tap coefficient of the Feed Forward filter in response to the measured eye-diagram opening or power ratio being lower than a target value.

13. An optical transmitter in accordance with claim 10, wherein the spectral filter further comprises an optical spectral equalizer for equalizing the modulated optical signal and the feedback controller is adapted to increase the gain of a high-frequency channel of the optical spectral equalizer in response to the measured eye-diagram opening or power ratio being lower than a target value.

14. A optical communication system comprising:
   an optical transmitter further comprising:
      an optical modulator for modulating an optical signal with a multilevel amplitude-shift-keying modulation;
      a spectral filter adapted to increase a high-frequency component of the modulated optical signal relatively to a central frequency component; and
      a feedback loop further comprising a quality measurement module for measuring a quality of the transmitted optical signal and a feedback controller for reconfiguring the spectral filter as a function of the measured quality;
   an optical receiver, and
   an optical link connecting the optical receiver to the optical transmitter in the optical domain, wherein the optical receiver is a direct detection receiver and wherein a range of the optical communication system is shorter than 100 km.

* * * * *